US012014507B2

(12) United States Patent
Guo et al.

(10) Patent No.: US 12,014,507 B2
(45) Date of Patent: Jun. 18, 2024

(54) SYSTEMS AND METHODS FOR TRAINING A PREDICTION SYSTEM

(71) Applicant: Toyota Motor Engineering & Manufacturing North America, Inc., Plano, TX (US)

(72) Inventors: Rui Guo, San Jose, CA (US); Xuewei Qi, Dublin, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 352 days.

(21) Appl. No.: 17/343,964

(22) Filed: Jun. 10, 2021

(65) Prior Publication Data

US 2022/0398758 A1    Dec. 15, 2022

(51) Int. Cl.
| | | |
|---|---|---|
| *G06T 7/50* | (2017.01) | |
| *G06N 3/04* | (2023.01) | |
| *G06N 3/045* | (2023.01) | |
| *G06N 3/08* | (2023.01) | |
| *G06N 3/088* | (2023.01) | |

(52) U.S. Cl.
CPC ............... *G06T 7/50* (2017.01); *G06N 3/045* (2023.01); *G06N 3/088* (2013.01); *G06T 2207/10016* (2013.01); *G06T 2207/20081* (2013.01); *G06T 2207/20084* (2013.01); *G06T 2207/30252* (2013.01)

(58) Field of Classification Search
CPC ............ G06T 7/50; G06T 2207/10016; G06T 2207/20081; G06T 2207/20084; G06T 2207/30252; G06N 3/045; G06N 3/088
See application file for complete search history.

(56) References Cited

U.S. PATENT DOCUMENTS

| | | |
|---|---|---|
| 7,113,867 B1 | 9/2006 | Stein |
| 10,762,650 B1 | 9/2020 | Guo et al. |

(Continued)

FOREIGN PATENT DOCUMENTS

CN    107578436 A    1/2018

OTHER PUBLICATIONS

Ranjan, Anurag, et al. "Competitive collaboration: Joint unsupervised learning of depth, camera motion, optical flow and motion segmentation." Proceedings of the IEEE/CVF conference on computer vision and pattern recognition. 2019. (Year: 2019).*

(Continued)

*Primary Examiner* — Bobbak Safaipour
*Assistant Examiner* — Jongbong Nah
(74) *Attorney, Agent, or Firm* — Christopher G. Darrow; DARROW MUSTAFA PC

(57) ABSTRACT

System, methods, and other embodiments described herein relate to training a prediction system for improving depth perception in low-light. In one embodiment, a method includes computing, in a first training stage, losses associated with predicting a depth map for a synthetic image of a low-light scene, wherein the losses include a pose loss, a flow loss, and a supervised loss. The method also includes adjusting, according to the losses, a style model and a depth model. The method also includes training, in a second training stage, the depth model using a synthetic representation of a low-light image. The method also includes providing the depth model.

20 Claims, 9 Drawing Sheets

(56) References Cited

U.S. PATENT DOCUMENTS

| | | |
|---|---|---|
| 10,867,404 B2 | 12/2020 | Guo et al. |
| 2008/0137989 A1 | 6/2008 | Ng et al. |
| 2020/0143552 A1 | 5/2020 | Bao et al. |

OTHER PUBLICATIONS

Yin, Zhichao, and Jianping Shi. "Geonet: Unsupervised learning of dense depth, optical flow and camera pose." Proceedings of the IEEE conference on computer vision and pattern recognition. 2018. (Year: 2018).*

Sun, Lei, et al. "See clearer at night: towards robust nighttime semantic segmentation through day-night image conversion." Artificial Intelligence and Machine Learning in Defense Applications. vol. 11169. SPIE, 2019. (Year: 2019).*

Liu, Lina, et al. "Self-supervised monocular depth estimation for all day images using domain separation." Proceedings of the IEEE/CVF International Conference on Computer Vision. 2021. (Year: 2021).*

Wang, Guangming, et al. "Unsupervised learning of depth, optical flow and pose with occlusion from 3d geometry." IEEE Transactions on Intelligent Transportation Systems 23.1 (2020): 308-320. (Year: 2020).*

Uzpak, Ali, Abdelaziz Djelouah, and Simone Schaub-Meyer. "Style transfer for keypoint matching under adverse conditions." 2020 International Conference on 3D Vision (3DV). IEEE, 2020. (Year: 2020).*

Atapour-Abarghouei et al., "Real-time monocular depth estimation using synthetic data with domain adaptation," Proceedings of the IEEE Conference on Computer Vision and Pattern Recognition, Jun. 2018, pp. 2800-2810.

Goodfellow et al., "Generative adversarial nets," In Advances in neural information processing systems, 2014, pp. 2672-2680.

Mirza et al., "Conditional generative adversarial nets," arXiv preprint arXiv:1411.1784, Nov. 6, 2014, pp. 1-7.

Anoosheh et al., "Night-to-Day Image Translation for Retrieval-based Localization," 2019 International Conference on Robotics and Automation, 2019, pp. 5958-5964.

Vankadari et al., "Unsupervised Monocular Depth Estimation for Night-time Images using Adversarial Domain Feature Adaptation," Computer Vision—ECCV 2020, Lecture Notes in Computer Science, vol. 12373, pp. 443-459.

PNVR et al., "SharinGAN: Combining Synthetic and Read Data for Unsupervised Geometry Estimation," Proceedings of the IEEE/CVF Conference on Computer Vision and Pattern Recognition, 2020, pp. 13974-13983.

* cited by examiner

SYSTEMS AND METHODS FOR TRAINING A PREDICTION SYSTEM

TECHNICAL FIELD

The subject matter described herein relates, in general, to training a system, and, more particularly, to training a prediction system for depth perception in low-light.

BACKGROUND

Systems may use sensor data to facilitate depth perception of objects within an image. For example, vehicles may be equipped with sensors that facilitate estimating depth of other vehicles, obstacles, pedestrians, and additional aspects of a surrounding environment from images. In various implementations, a vehicle may be equipped with a light detection and ranging (LIDAR) sensor that uses light to scan the surrounding environment, while logic associated with the LIDAR analyzes acquired information to facilitate detecting the presence of objects and other features of the surrounding environment. In further examples, additional sensors such as cameras may be implemented to acquire information about an environment from which a system derives awareness for a vehicle or any computing device. For example, this sensor data can be useful in various circumstances for improving perceptions of the surrounding environment so that systems such as automated driving systems can accurately plan and navigate.

Moreover, a system may use a monocular camera to facilitate predicting depth of objects within an image without relying on data from a LIDAR sensor, stereo cameras, or other sensors to reduce complexity. For instance, a depth model can use images from the monocular camera to generate a depth map. For robust operation, the system may train the depth model for different lighting conditions. Still, computations may experience difficulties for training a system for low-light conditions, particularly for depth perception.

SUMMARY

In one embodiment, example systems and methods relate to training a system for low-light conditions to improve depth perception. In various implementations, a system using an image from a monocular camera to predict depth may experience difficulties generating a depth map in low-light, such as at nighttime. Furthermore, complexity may increase when combining information from a monocular camera with other sensor data to increase the clarity of a depth map for a low-light image. Therefore, in one embodiment, a prediction system may train a machine learning (ML) architecture, in part, by using synthetic images of a low-light environment to generate depth maps. Here, a first training stage may use a synthetic image related to a simulated model associated with a low-light environment. In one approach, the prediction system may perform training by converting, using a style model, the synthetic image of the low-light environment to a daytime representation as an input to a depth model for generating a depth map. In particular, depth map clarity may be increased by computing losses, due to object motion between image frames, using pose and flow losses for the first training stage to improve semantic consistency of the network. For example, the prediction system may train the style and depth models by adjusting parameters using the pose and flow losses. In this way, the prediction system improves depth map generation in the low-light environment by processing in daytime and adjustments for losses in a synthetic domain of the first training stage.

Moreover, the prediction system may use a second training stage to convert a low-light image of a real scene to a synthetic representation using an adversarial network. Here, the second training stage may use the synthetic representation in a simulated scene of the low-light environment for estimating depth. As such, the prediction system may then process the synthetic representation using the style and depth models, trained in the first training stage, for the second training stage to generate a depth map. In addition, the prediction system may perform training in the second stage according to losses due to converting low-light images from the real scene to a synthetic daytime representation and generating the depth map. In this way, the prediction system may increase the clarity of depth maps about low-light environments from improved semantics during training by adjusting for the pose and flow losses. Improved semantics may also increase the clarity of depth maps generated by the prediction system from a sequence of images taken by a monocular camera, thereby benefiting applications that rely on higher resolution depth maps.

In one embodiment, training a prediction system to improve depth perception in low-light is disclosed. The prediction system includes a processor and a memory storing instructions that, when executed by the processor, cause the processor to compute, in a first training stage, losses associated with predicting a depth map for a synthetic image of a low-light scene, wherein the losses include a pose loss, a flow loss, and a supervised loss. The instructions also includes instructions to adjust, according to the losses, a style model and a depth model. The instructions also includes instructions to train, in a second training stage, the depth model using a synthetic representation of a low-light image. The instructions also includes instructions to provide the depth model.

In one embodiment, a non-transitory computer-readable medium for training a prediction system to improve depth perception in low-light and including instructions that when executed by a processor cause the processor to perform one or more functions is disclosed. The instructions include instructions to compute, in a first training stage, losses associated with predicting a depth map for a synthetic image of a low-light scene, wherein the losses include a pose loss, a flow loss, and a supervised loss. The instructions also include instructions to adjust, according to the losses, a style model and a depth model. The instructions also include instructions to train, in a second training stage, the depth model using a synthetic representation of a low-light image. The instructions also include instructions to provide the depth model.

In one embodiment, a method for training a prediction system to improve depth perception in low-light is disclosed. In one embodiment, the method includes computing, in a first training stage, losses associated with predicting a depth map for a synthetic image of a low-light scene, wherein the losses include a pose loss, a flow loss, and a supervised loss. The method also includes adjusting, according to the losses, a style model and a depth model. The method also includes training, in a second training stage, the depth model using a synthetic representation of a low-light image. The method also includes providing the depth model.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
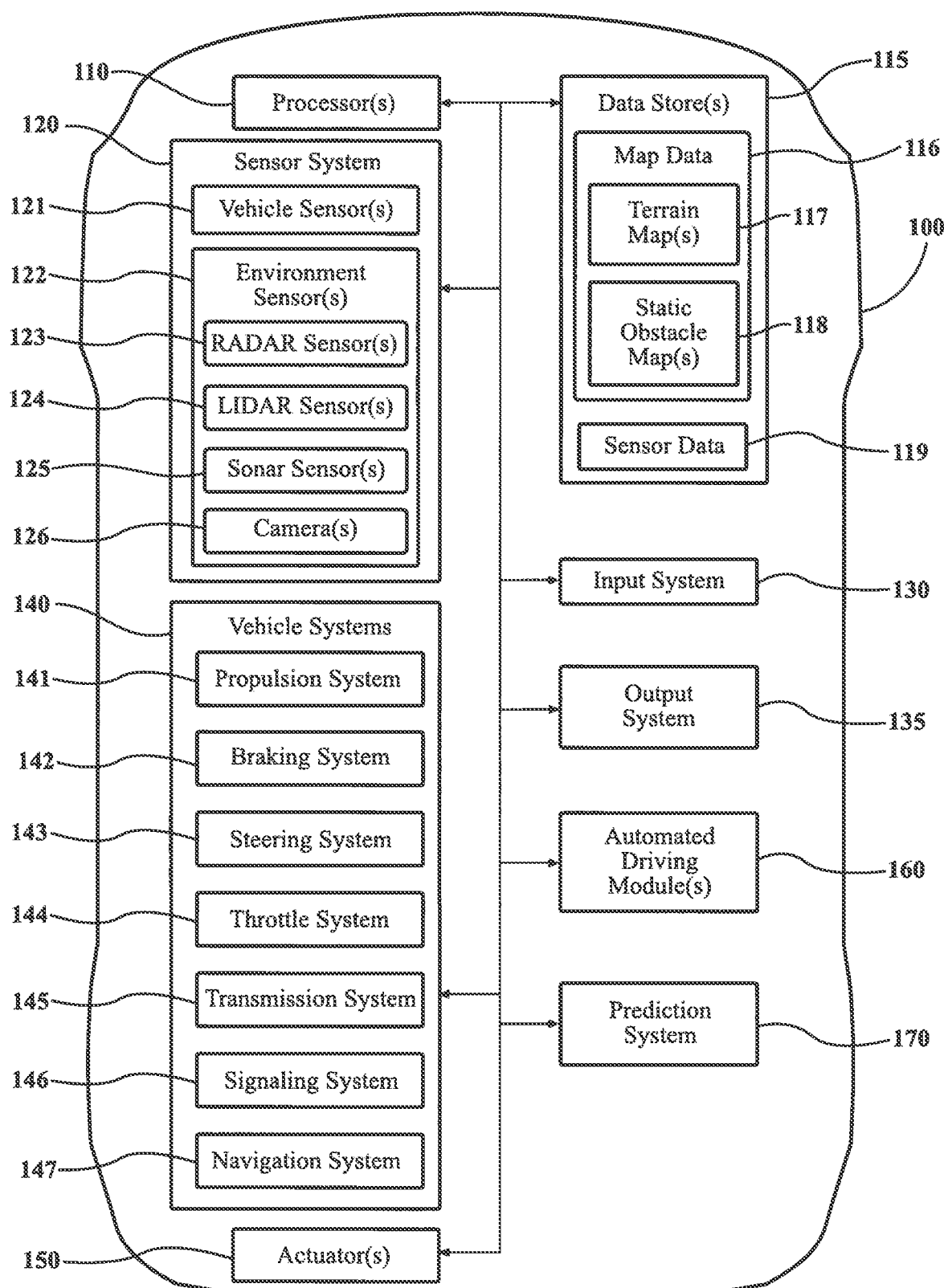
FIG. 1 illustrates one embodiment of a vehicle within which systems and methods disclosed herein may be implemented.

Systems, methods, and other embodiments associated with training a prediction system for improving depth perception in low-light are disclosed herein. A prediction system for depth maps may train using two stages by relying on semantic consistency, thereby preventing dilution of generated content between style and depth models. In particular, the prediction system may use pose and flow models as supervision in a first training stage when generating a daytime representation and corresponding depth map of a synthetic image related to a simulated scene. The daytime representation may be related to a synthetic image from a low-light environment. Regarding lighting levels, low-light may represent lighting environments where systems using a monocular camera, a red/green/blue (RGB) camera(s), an optical camera(s), machine vision, and so on may have difficulties identifying object features due to muted color intensities.

Moreover, the prediction system may use in the first training stage a pose model to reinforce a style model by adjusting for movement of a camera and the flow model to reinforce the depth model by accounting for object movement. To reduce complexity, the first training stage may operate in the synthetic domain to simplify operation by reducing the reliance on real images, paired images, and so on by using image data simulated for a traffic scene. Whilst, the second training stage may use a real image from a camera(s) taken in a real low-light environment to complete the training.

Regarding architecture of the first training stage, the style model may perform style transfer by predicting the way object features appear, such as by colors, shading, lighting conditions, and so on. As such, a daytime representation may have the same content as the synthetic image while changing lighting or styles to increase richness. The depth model may be a network, such as a generative adversarial network (GAN), that generates a depth map from the daytime representation. The prediction system may subsequently compute various losses and a supervised loss for the first training stage through loss minimization. For example, pose losses may be minimized when the conversion of synthetic images reaches a threshold. Whilst, the prediction system may minimize flow losses associated with the dynamic movement of objects between daytime representations and related depth maps. As such, the prediction system may adjust model parameters in the first training stage using the losses until satisfying criteria for weights, such as by using additional synthetic images related to a traffic scene when the criteria are unmet.

Regarding architecture of the second training stage, the prediction system may continue training by converting a real image to a synthetic representation using an adversarial network. For instance, a low-light image of a real traffic scene may be converted to a synthetic representation for training the network about a real environment. Furthermore, the second training stage may inherit weights from the first training stage and process the synthetic representation using the style and depth models to computes losses for further training. For example, the prediction system may compute style transfer and supervision losses to satisfy criteria (e.g. minimum loss) for predicting depth maps associated with real images. As such, the processing in the second training stage may continue until model parameters meet the criteria for losses, such as by using additional real images related to the traffic scene when the criteria are unmet. In this way, the two-stage system improves domain training and synthetic image processing for more accurate depth maps in low-light by reducing image correspondence or correlations between stages.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the prediction system 170 may be used for consumer electronics (CE), mobile devices, robotic devices, drones, and so on. In some implementations, the vehicle 100 may be any robotic device or form of motorized transport that, for example, includes sensors to perceive aspects of the surrounding environment, and thus benefits from the functionality discussed herein associated with training of a prediction system for improving depth perception in low-light.

The vehicle 100 also includes various elements. It will be understood that in various embodiments, the vehicle 100 may have less than the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a prediction system 170 that is implemented to perform methods and other functions as disclosed herein relating to improving the training of a prediction system for depth perception in low-light. As will be discussed in greater detail below, the prediction system 170, in various implementations, may be implemented partially within a CE device, a mobile device, a robot, a drone, a vehicle and so on and as a cloud-based service. For example, in one approach, functionality associated with at least one module of the prediction system 170 is implemented within the vehicle 100 while further functionality is implemented within a cloud-based computing system.

Figure 2:
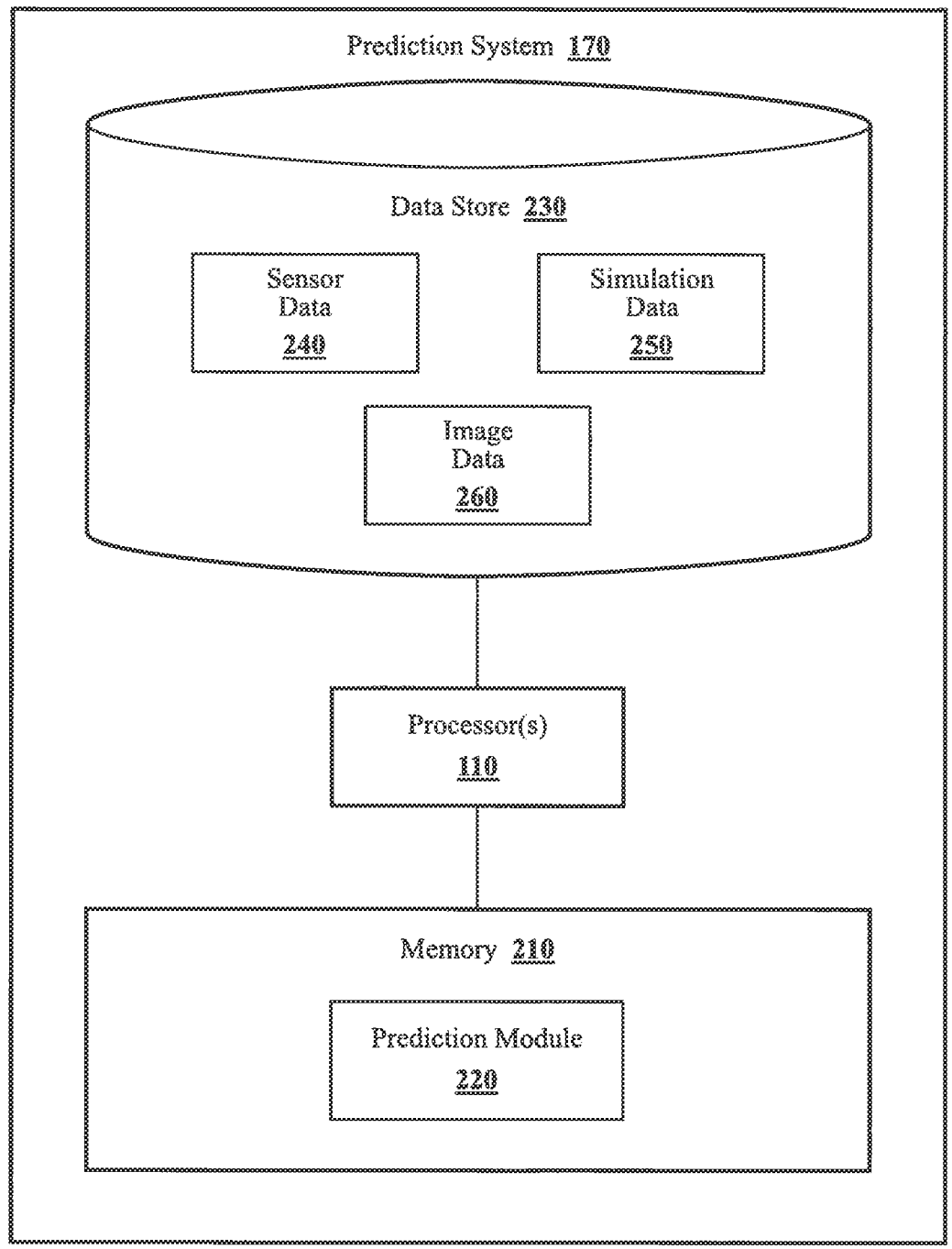
FIG. 2 illustrates one embodiment of a prediction system for estimating depth of objects within an image for low-light environments.

With reference to FIG. 2, one embodiment of the prediction system 170 of FIG. 1 is further illustrated. The prediction system 170 is shown as including processor(s) 110 from the vehicle 100 of FIG. 1. However, in other examples, the processor(s) 110 may be part of a CE device, a mobile device, a robot, a drone, and so on. Accordingly, the processor(s) 110 may be a part of the prediction system 170, the prediction system 170 may include a separate processor from the processor(s) 110 of the vehicle 100, or the prediction system 170 may access the processor(s) 110 through a data bus or another communication path. In one embodiment, the prediction system 170 includes a memory 210 that stores a prediction module 220. The memory 210 is a random-access memory (RAM), read-only memory (ROM), a hard-disk drive, a flash memory, or other suitable memory for storing the prediction module 220. The prediction module 220 is, for example, computer-readable instructions that when executed by the processor(s) 110 cause the processor(s) 110 to perform the various functions disclosed herein.

The prediction system 170 as illustrated in FIG. 2 is generally an abstracted form of the prediction system 170 as may be implemented between a CE device, mobile device, robot, drone, vehicle, and so on 100 and a cloud-computing environment. Furthermore, the prediction module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings.

Accordingly, the prediction module 220, in one embodiment, controls the respective sensors to provide the data inputs in the form of the sensor data 240. Additionally, while the prediction module 220 is discussed as controlling the various sensors to provide the sensor data 240, in one or more embodiments, the prediction module 220 can employ other techniques to acquire the sensor data 240 that are either active or passive. For example, the prediction module 220 can undertake various approaches to fuse data from multiple sensors when providing the sensor data 240 and/or from sensor data acquired over a wireless communication link.

Moreover, in one embodiment, the prediction system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the prediction module 220 in executing various functions. In one embodiment, the data store 230 includes the sensor data 240 along with, for example, metadata that characterize various aspects of the sensor data 240.

Moreover, in various embodiments, the data store 230 further includes the simulation data 250 and the image data 260. The simulation data 250 may include images of environments from various driving scenarios of the vehicle 100. The environments may include buildings, other vehicles, sidewalks, street lamps, guiderails, and so on. In addition, the data store 230 may include the image data 260 captured by a camera of the vehicle 100 and intensity and color information related to the image data 260. In one approach, the prediction module 220 may capture a sequence of images from a scene to compute a depth map according to changes between frames.

For training the prediction module 220, the prediction system 170 may utilize training stages. As described below, the prediction system 170 may compute losses with predicting a depth map for a synthetic image(s) of a nighttime scene in a first training stage. In one approach, overall losses may include a pose loss, a flow loss, and a supervised loss. The prediction system 170 may then adjust the parameters of a depth model and repeat the training process until convergence or meeting of criteria for the parameters. For example, the criteria may be that the losses satisfy a threshold or a magnitude for a resolution associated with a depth map in a certain application. The second training stage completes and refines the training using real images converted to daytime representations in order for the network to operate in real environments.

Figure 3A:
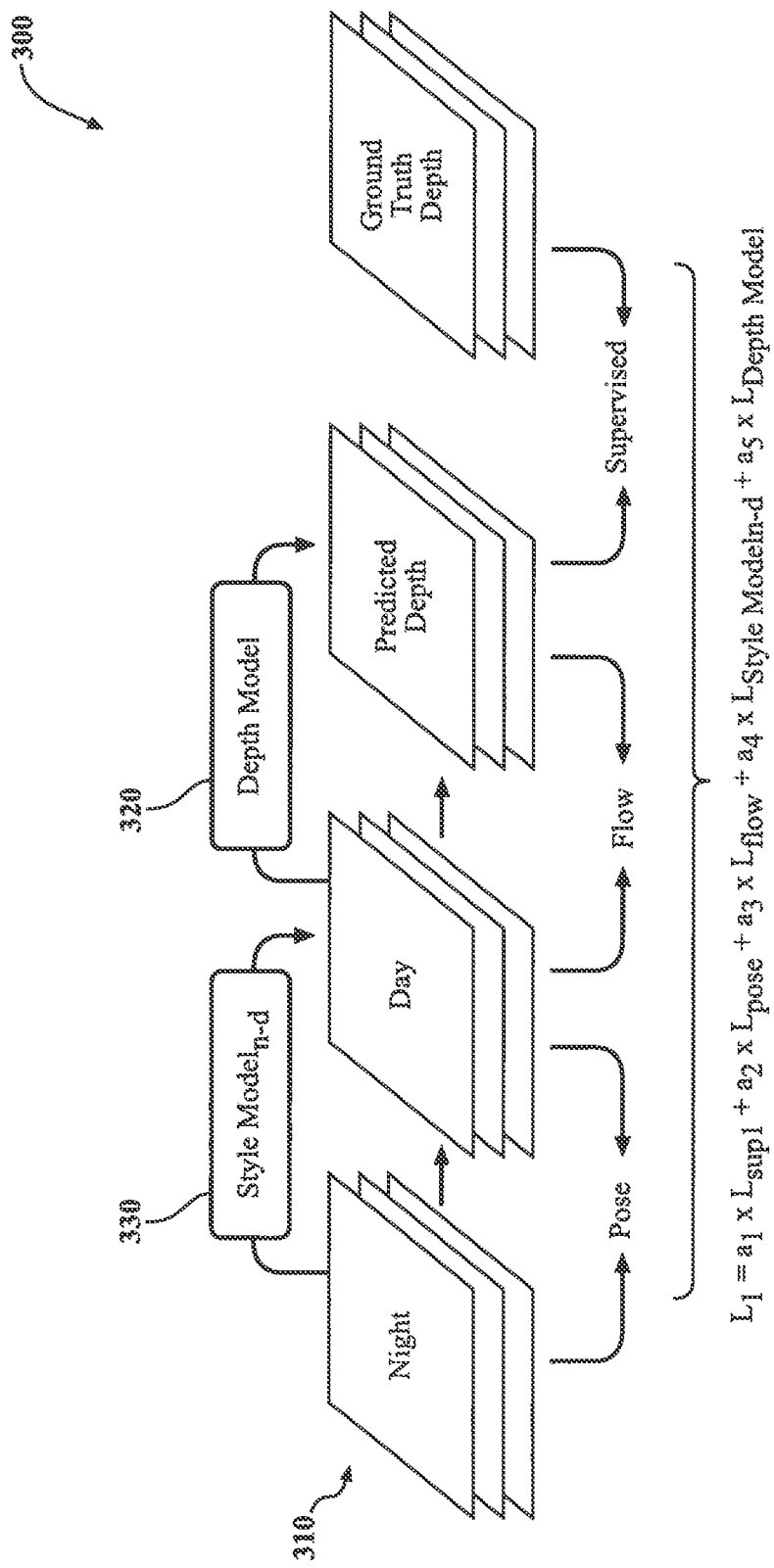
FIGS. 3A and 3B illustrate embodiments of training stages for the prediction system of FIG. 2.
Figure 3B:
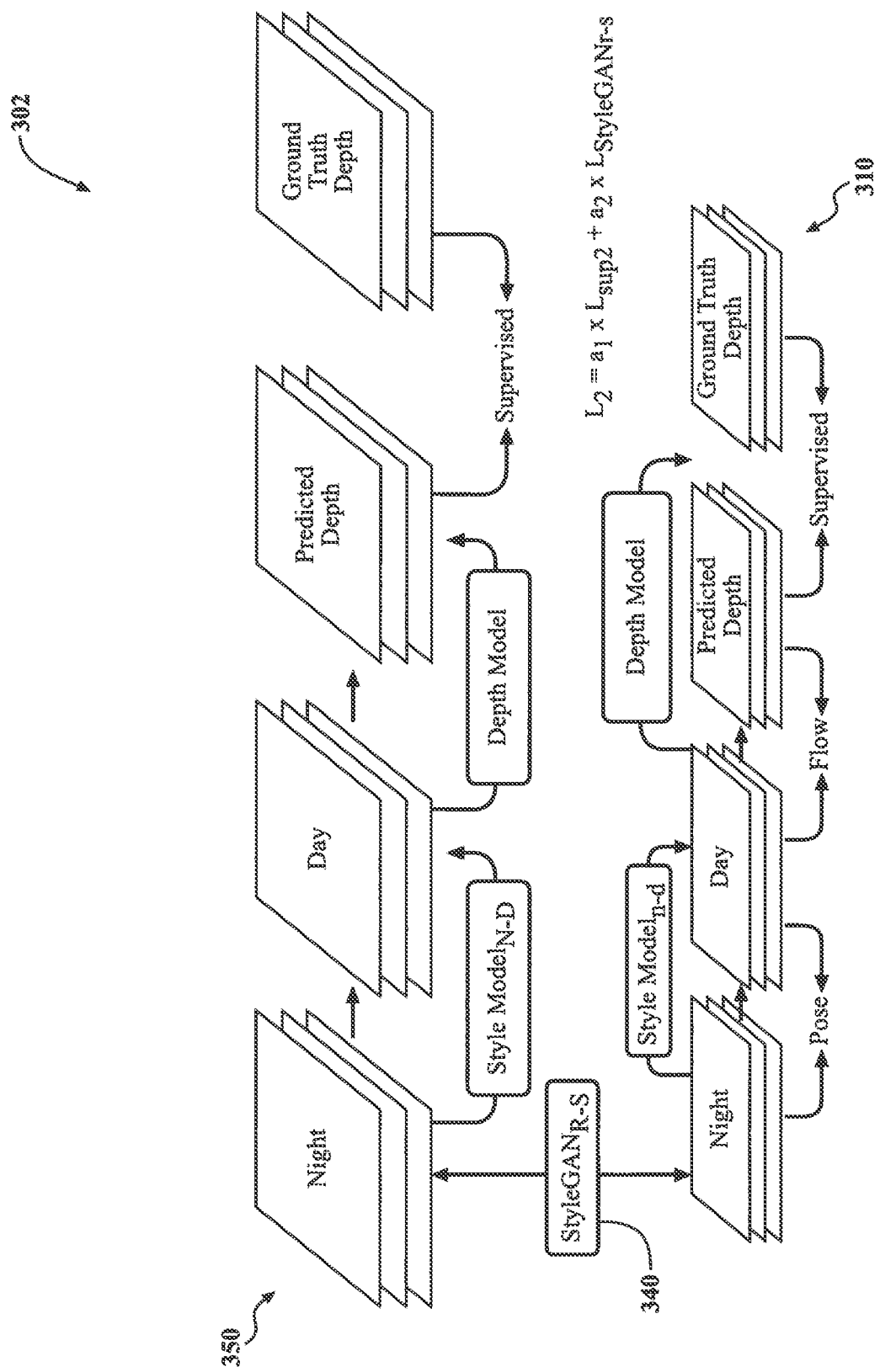

Now turning to FIGS. 3A and 3B, the systems 300 and 302 illustrate embodiments of training stages for the prediction system 170 of FIG. 2. In 300, a first training stage 310 may convert a sequence of synthetic images from a low-light, nighttime, or inclement weather scene to increased light for training the prediction system 170. In various embodiments, a server may use data to train the prediction system 170 offline. As explained below, the first training stage 310 may operate in the synthetic domain to simplify operation by reducing the reliance on real images, paired images, real ground truths, and so on. For instance, operations in the synthetic domain may utilize daytime representations for a current traffic scenario in a synthetic nighttime scene instead of a real scene.

Regarding using simulated data for the synthetic domain, a simulator may generate the synthetic images of real-world urban, suburban, highway, and so on environments. In one approach, the simulator may operate on a server or network offline for training, thereby reducing the reliance of computing resources in the vehicle 100.

For understanding lighting levels, low-light may represent lighting environments where systems using a monocular camera, a RGB camera(s), an optical camera(s), machine vision, and so on may have difficulties identifying object features due to muted color intensities. For instance, driving the vehicle 100 during nighttime or using the prediction system 170 in the dark, indoors, at twilight, and so on may be environments having low-light. Increased light may represent brighter lighting conditions where systems using a monocular camera, a RGB camera(s), an optical camera(s), machine vision, and so on may reliably identify object features from the color intensities. For example, driving the vehicle 100 during daytime or using the prediction system 170 in the daylight, outdoors, in the morning, and so on may be environments having increased light. Of course, reference to daytime versus nighttime to define lighting levels can generally be subjective due to variations in weather and other factors influencing lighting. Lux (lx) may represent lighting levels as a unit of luminance per square meter. Accordingly, daytime, increased light, brighter lighting, and so on generally refer to conditions in which the ambient light may have sufficient lumens (e.g. 30 k lx to 100 k lx) for identifying object features related to depth processing. On the contrary, nighttime, low-light, indoors, and so on generally refer to conditions in which the ambient light may have insufficient lumens (e.g. 1 lx to 60 lx) for identifying object features.

Moreover, the first training stage 310 may convert the sequence of synthetic images to a sequence of daytime representations using the Style Model$_{n-d}$ 330. In particular, the Style Modeled 330 may perform style or domain transfer by predicting the way object features appear such as by colors, shadows, shading, lighting conditions, and so on. As such, the daytime representation has the same content while changing lighting or styles to increase richness for depth processing.

Regarding architecture, in various implementations, the Style Model$_{n-d}$ 330 may be a GAN or neural network that predicts color intensities to identify object features about a low-light scene. A GAN may include a pair of neural networks that compete in a zero-sum game for learning. The GAN output may be new data generated with similar statistics as training data. Here, a GAN may convert real or synthetic image(s) by predicting the way object features appear such as by colors, shadows, shading, lighting conditions, and so on.

Figure 4:
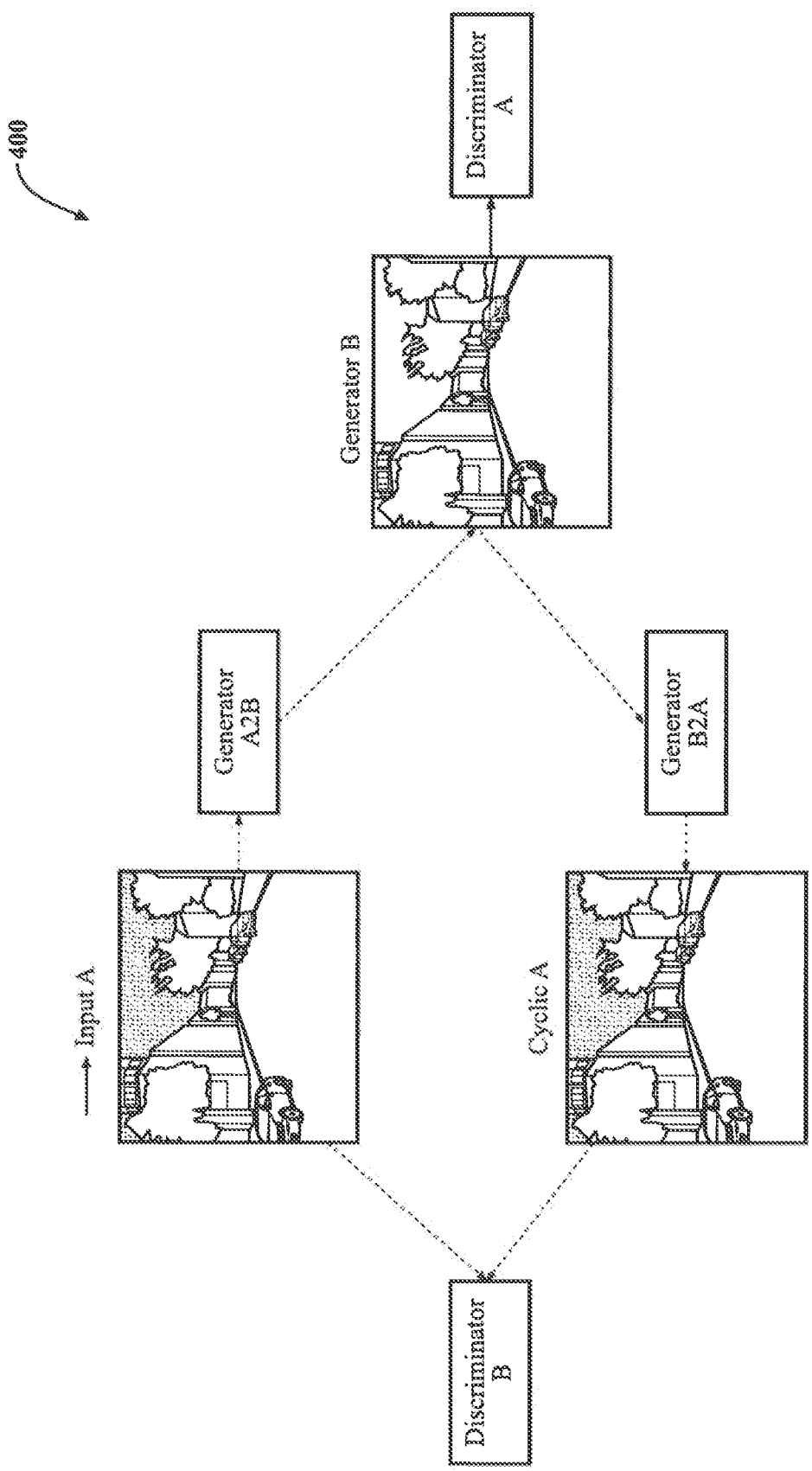
FIG. 4 illustrates an example of a discriminator model used with a prediction system.

Moreover, a GAN may achieve indirect learning through an adaptive discriminator. FIG. 4 illustrates an example of a discriminator model 400 for the prediction system 170. The discriminator model 400 may operate in conjunctions with a cyclic or conditional GAN (cGAN) for classifying data. In one approach, the generator A2B may convert a real image A taken in low-light to a daytime representation B. The discriminator A processes the daytime representation B for back propagation and subsequent conversion by the generator B2A to generate the cyclic image A. The cyclic image A may represent a reconstructed low-light image of the real image A to determine the reversibility of generator A2B. As such, the discriminator B compares losses of the real image A to the cyclic image A to adjust weights for training. In this approach, a system may train the cGAN by fooling the discriminator B instead of minimizing the distance to a specific object in an image so that the model learns unsupervised. This process in the discriminator model 400 continues until convergence of the GAN to complete training.

Furthermore, a GAN trained on real or synthetic images can generate new images that appear authentic to humans with realistic characteristics while having underlying changes. Here, a GAN may generate a new synthetic image with the controlled property of increased light for realistic rendering. The rendered image may preserve the content and distance semantics of the low-light environment for the prediction system to generate a depth map.

As a sequence of synthetic images are converted, the prediction system 170 may compute pose losses by comparing a low-light synthetic image to a daytime representation using a pose model. The pose model may be a neural network that estimates time, location, position, angle, and so on of an image sensor or camera relative to objects in an image. For the vehicle 100, the pose losses may vary due to camera motion from road or environmental conditions. As such, the pose model may factor and adjust the camera model according to the pose losses between the sequence of synthetic images and daytime representations. In one approach, the pose model may be a convolutional neural network (CNN), a PoseNet model, and so on that estimates a pose of a person or animal within a synthetic image. Furthermore, a pose loss may be minimized when the conversion of a synthetic image(s) by the Style Model$_{n-d}$ 330 reaches a threshold over a sequence of images.

Once the prediction system 170 computes a sequence of daytime representations, the depth model 320 may predict depth maps from the sequence. In one approach, the depth model 320 may be a GAN or cGAN that predicts depth according to the input image being the condition. As such, the cGAN may regulate noise while generating images for a depth map substantially similar in content to the synthetic daytime representations inputted. The output of the cGAN may be a depth map in grayscale where the intensity of each pixel represents the distance between an object and an image sensor or camera.

Figure 5:
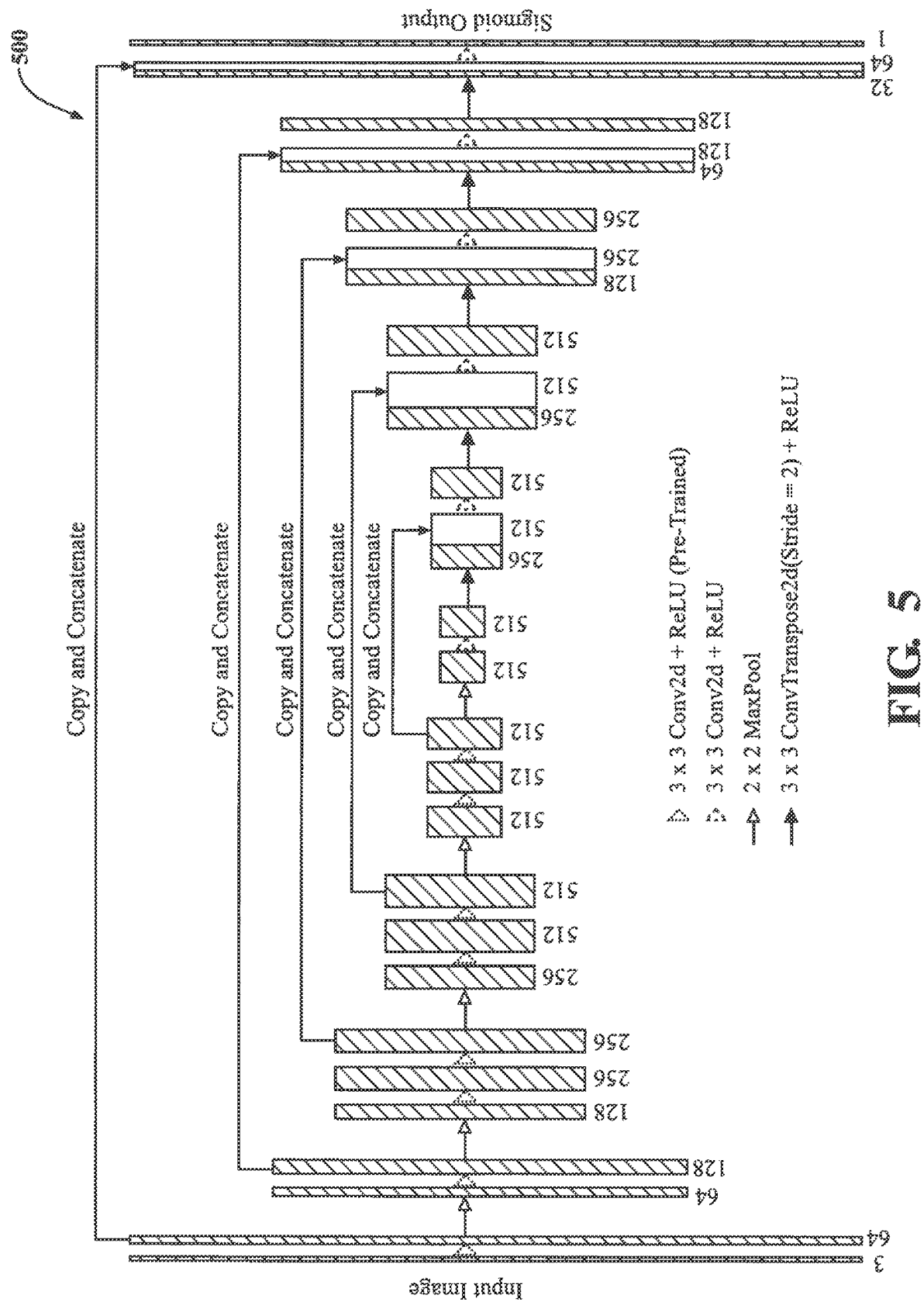
FIG. 5 illustrates one embodiment of an encoder-decoder network to estimate the depth of objects within an image for low-light environments.

Regarding the architecture of the depth model 320, FIG. 5 illustrates one embodiment of an encoder-decoder network 500 to estimate depth of objects within an image for low-light environments. In one approach, the encoder-decoder network 500 may be a deep neural network (DNN) in a diabolic shape using multiple layers to transform the intensity space of an original pixel of a synthetic daytime representation. In particular, the encoder-decoder network 500 may transform the original pixel non-linearly into another space that improves intrinsic properties of the synthetic daytime representation.

Furthermore, encoder layers 3, 64, 128, 256, and 512 may utilize 3×3 two dimensional (2D) convolutional layers and rectifier linear units that are pre-trained between different layers. In one approach, encoder layers 64, 128, 256, and 512 may utilize maximum pool operations within layers in order to output salient features of a previous feature map. On the decoder side, decoder layers 1, 64, 128, 256, and 512 may utilize 3×3 2D convolutional layers and rectifier linear units within layers. In addition, the decoder layers 32, 64, 128, 256, and 512 may utilize a convolutional transpose in 2D, a stride of 2, and rectifier linear units. Accordingly, the output of the encoder-decoder network 500 may be feature maps having a group of matrices with numerical elements to generate depth maps.

Regarding additional losses, the prediction system 170 may compute the flow losses using a flow model for the depth maps generated by the depth model 320. The flow model may be a neural network that determines the flow losses due to the dynamic movement of objects between the sequence of daytime representations and depth maps for adapting the depth model. For example, the flow model may use edge or boundary information to identify the dynamic movement of objects. In one approach, the flow model may be a CNN, an optical flow model, a FlowNet model, and so on that stacks in a network two sequentially adjacent input images together to estimate object motion. Moreover, the depth model 320 may adapt using the flow model for smoother and gradual changes in depth maps.

In the above description, the pose and flow models may be auxiliary tasks or constraints to refine training of the prediction system 170. In particular, simultaneously adjusting for the pose and flow losses may provide semantic consistency across modalities to train the depth model 320 that accordingly increases the depth accuracy for objects within a synthetic image(s), particularly low-light image(s). Semantics may provide essential information for completely understanding scene structure. For instance, a pose model may provide the prediction system 170 the observation anchor and origin point that improves depth estimation. At the same time, an optical flow is another semantic of a scene to understand the movement of dynamic objects across a sequence of images. In other words, a system relying on semantic consistency for training may prevent dilution of generated content between models of a training stage by using pose and flow models as supervision.

Regarding further training for the depth prediction, the prediction system 170 may compute the losses $L_1$ in the first training stage 310 for loss minimization as follows:

$$L_1 = a_1 \times L_{sup1} + a_2 \times L_{pose} + a_3 \times L_{flow} + a_4 \times L_{Style\ Model_{n-d}} + a_5 \times L_{Depth\ Model}.$$  Equation (1)

Variables $a_1$-$a_5$ in Equation (1) may be hyperparameters used to control the learning process in the first training stage 310. In addition to the losses described above, the prediction system 170 may compute the supervised loss $L_{sup1}$ by comparing the depth map predicted by the depth model 320 to a ground truth generated according to LIDAR simulations. For instance, the supervised loss may represent a photometric per-pixel loss between a predicted and ground truth depth map.

Furthermore, in Equation (1) $L_{Style\ Model_{n-d}}$ and $L_{Depth\ Model}$ may be forward or nominal losses of the style and depth models, respectively, used with the pose lose $L_{pose}$ and the flow loss $L_{flow}$ to compute overall loss from generating a depth map. For example, $L_{pose}$ may be a difference of x, y, z coordinates between a low-light synthetic image and a daytime representation. In addition, $L_{flow}$ may represent a per-pixel difference between the daytime representation and a depth map. In one approach, the prediction system 170 may back-propagate to tune parameters, weights, or internal coefficients of the Style Model$_{n-d}$ 330 or the depth model 320 until $L_1$ losses satisfy criteria for predicting depth maps.

Turning now to the second training stage 350, the prediction system 170 may use a real image that is converted by the StyleGAN$_{R-S}$ 340 to a synthetic image. For example, the StyleGAN$_{R-S}$ 340 may convert a real image from low-light conditions in a training dataset to a synthetic image while maintaining content, shading, shadows, and so on. FIG. 3B shows the two-stage system 302 having the second training stage 350 with the first training stage 310. The second training stage 350 may process a real image to a synthetic daytime representation and inherits weights from the first training stage 310 to generate a depth map. Furthermore, models of hidden variables for a style distribution may also be set between the two stages to improve depth prediction. A hidden or latent variable may be data that is not observed but are part of the trained network. In one approach, the second training stage 350 may use a real image from a monocular camera of the vehicle 100 taken in low-light environments for depth estimations whereas the first training stage 310 uses image data simulated for a current traffic scene. In this way, the two-stage system 302 improves domain training and synthetic image processing for more accurate depth maps in low-light by reducing image correspondence or correlations between stages.

Regarding training for the second training stage 350, the prediction system 170 may compute style transfer and supervision losses to minimize and satisfy criteria for predicting depth maps associated with a real image. The prediction system 170 uses real images in the second training stage 350 for real implementations in the vehicle 100. In one approach, the prediction system 170 may compare a predicted depth map to a point cloud generated by LIDAR simulations for a given nighttime scene. In this way, the second training stage may utilize semi-supervision to improve depth prediction.

Regarding second stage losses, the prediction system 170 may compute overall losses $L_2$ in the second training stage 350 for loss minimization as follows:

$$L_2 = a_1 \times L_{sup2} + a_2 L_{StyleGANR-S}.$$  Equation (2)

Variables $a_1$ and $a_2$ in Equation (2) may be hyperparameters used to control the learning process in the second training stage 350. Here, $L_{sup2}$ may be a supervised loss computed by comparing the depth map predicted by the depth model to a ground truth generated according to LIDAR simulations in the second training stage 350. For instance, the supervised loss may represent a photometric per-pixel loss between a predicted and ground truth depth map. Furthermore, the loss $L_{StyleGANR-S}$ may represent forward or nominal losses associated with converting the real image to a synthetic image. For instance, this loss may represent color intensities, scaling, and other information lost from converting a real image taken in low-light conditions to a synthetic image. Accordingly, the prediction system 170 may process real images for the second training stage until $L_2$ losses satisfy the criteria for predicting depth maps.

Figure 6A:
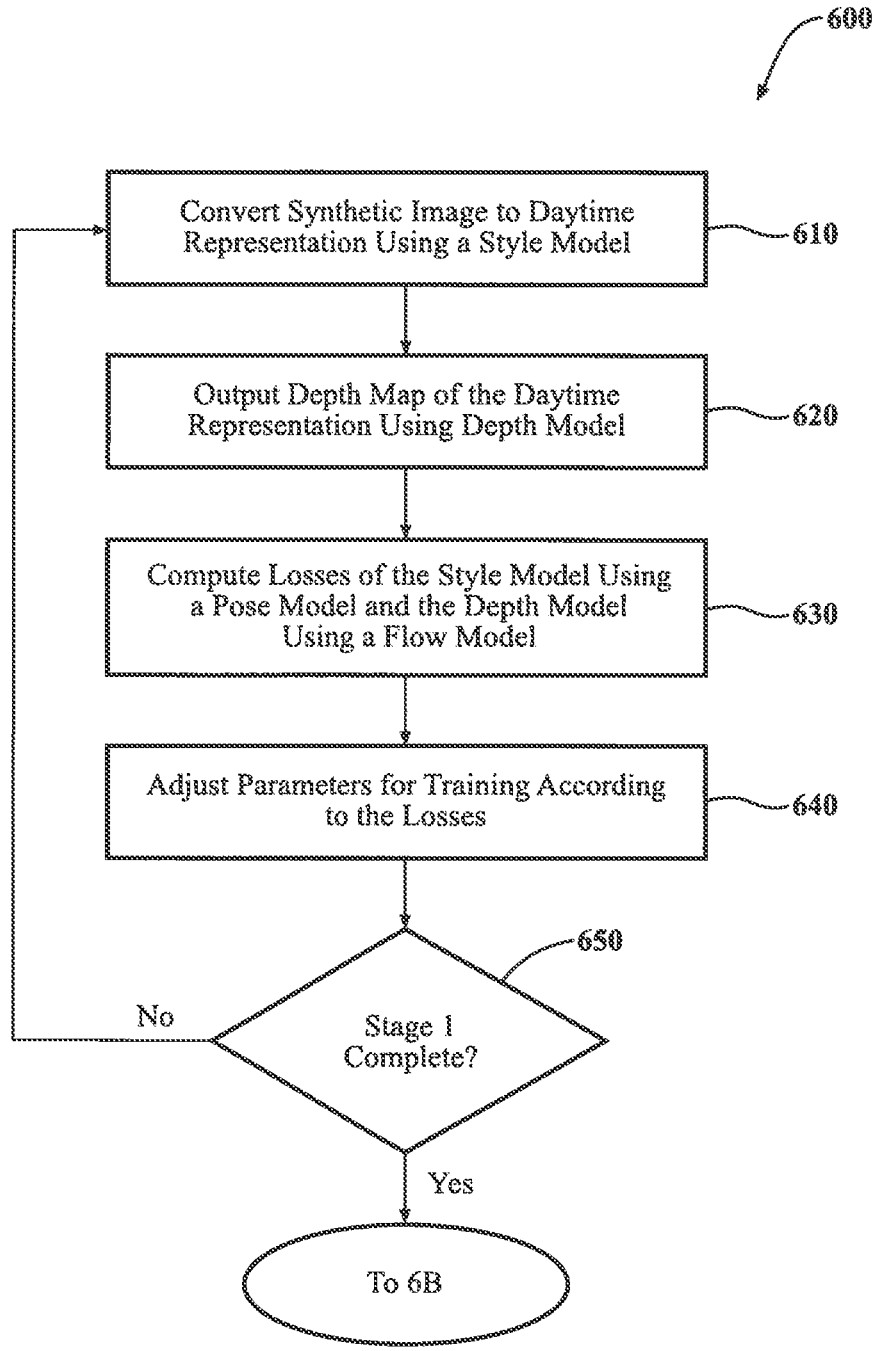
FIGS. 6A and 6B illustrate one embodiment of a method that is associated with training a prediction system for estimating the depth of objects within an image using two stages.
Figure 6B:
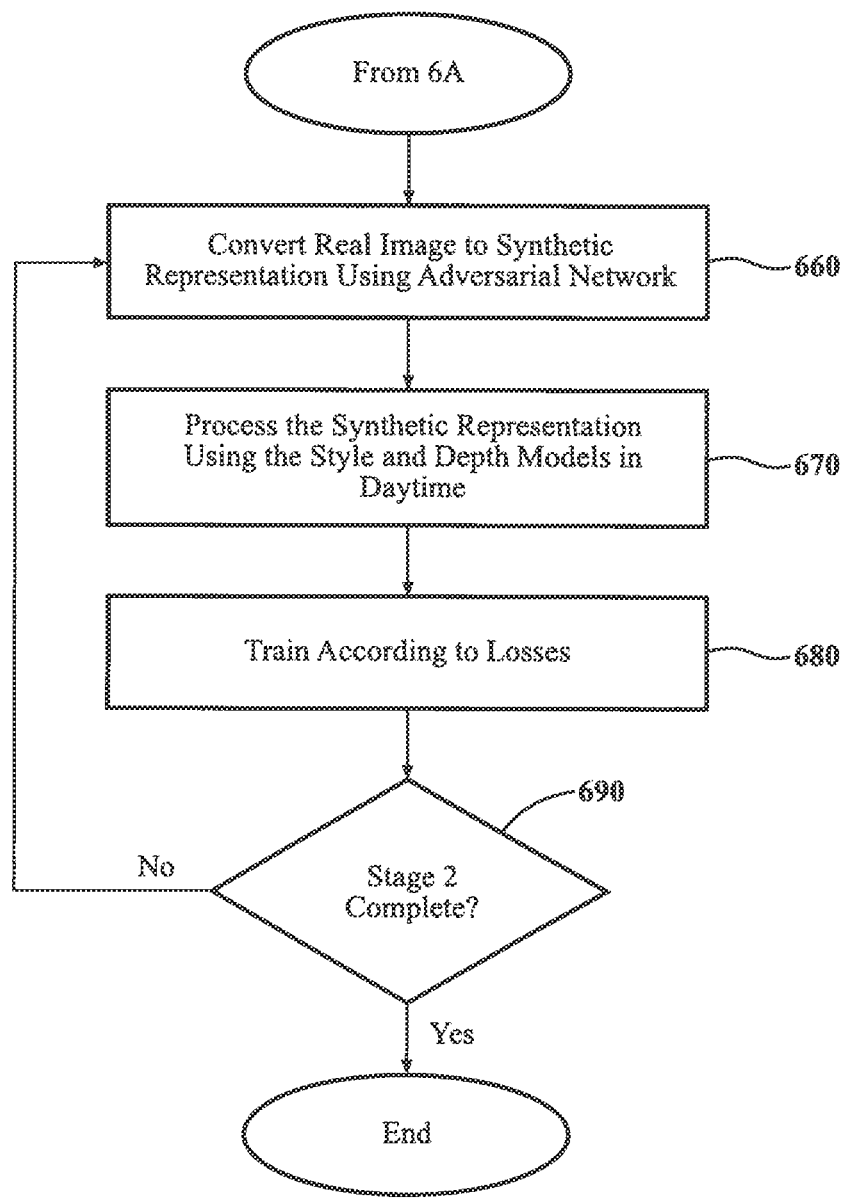

Turning now to FIGS. 6A and 6B, flowcharts of a method 600 associated with improving prediction of depth for objects within a low-light image(s) are illustrated. Method 600 will be discussed from the perspective of the prediction system 170 of FIGS. 1, and 2. While method 600 is discussed in combination with the prediction system 170, it should be appreciated that the method 600 is not limited to being implemented within the prediction system 170 but is instead one example of a system that may implement the method 600. For a brief explanation, in various implementations, method 600 may involve using two training stages where a first training stage converts synthetic images of low-light conditions associated with a traffic scene to increased light for training the prediction system 170. The first training stage may operate in the synthetic domain to simplify operation by reducing the reliance on real images, paired images, real ground truths, and so on using image data simulated for a traffic scene. Furthermore, a second training stage may use a real image(s) from a training dataset or a monocular camera of the vehicle 100 taken in a low-light environment to complete training. In this way, the two-stage system improves domain training and synthetic image processing for more accurate depth maps in low-light by reducing image correspondence or correlations between stages.

At 610, the prediction system 170 converts a synthetic image(s) to a daytime representation using a style model in a first training stage. As explained above, the prediction system 170 may convert a sequence of synthetic images from a low-light environment to a sequence of daytime representations using a style model. Regarding lighting levels, low-light may represent lighting environments where systems using a monocular camera, a RGB camera(s), an optical camera(s), machine vision, and so on may have difficulties identifying object features due to muted color intensities. Also as explained above, the style model may be a GAN that performs style or domain transfer by predicting the way object features appear such as by colors, shadows, shading, lighting conditions, and so on. As such, the daytime representation may have the same content while changing lighting or styles to increase richness for depth processing.

At 620, the prediction system 170 outputs a depth map of the daytime representation using a depth model. In one approach, once the prediction system 170 computes a sequence of daytime representations, the depth model may predict depth maps from the sequence. The depth map may be in grayscale where the intensity of each pixel represents the distance between an object and an image sensor or camera. In one approach, the depth model may be a GAN or cGAN that predicts depth according to the input image being the condition. As such, the cGAN may regulate noise while generating images for a depth map substantially similar in content to synthetic daytime inputs.

At 630, the prediction system 170 computes the losses of the style model using a pose model and the depth model using a flow model during the first training stage. Details of the loss functions used by the prediction system 170 are explained above. The pose model may be a network (e.g. CNN) that estimates time, location, position, angle, and so on of an image sensor or camera relative to objects in a captured image(s). In one approach, a pose loss may be minimized when the conversion of a synthetic image(s) by the style model reaches a threshold. Furthermore, the flow model may be a network (e.g. CNN) that determines the flow losses due to the dynamic movement of objects between the sequence of daytime representations and the depth map sequences. As such, the depth model may adapt using the flow model for smoother and gradual changes in a sequence of depth maps thereby improving performance of the network.

At 640, the prediction system 170 adjusts parameters for training according to the losses. In one approach, the pose and flow models may be auxiliary tasks to refine training in the synthetic domain. In particular, simultaneously adjusting for the pose and flow losses may provide semantic consistency across modalities to train the depth model, thereby increasing the accuracy of depth estimates for objects within a synthetic image(s). This consistency may particularly improve the processing of low-light image(s) where objects are less pronounced. For instance, a pose model may provide the prediction system 170 the observation anchor and origin point that improves depth estimation. As explained above, an optical flow is another semantic for understanding the movement of dynamic objects across a sequence of images. Therefore, a system relying on semantic consistency for training may prevent the dilution of generated content between models of a training stage by using pose and flow models as supervision.

At 650, the prediction system 170 adjusts parameters of the depth model and continues the training until convergence or meeting of criteria for the model parameters or weights. For example, the criteria may be that the losses satisfy a threshold or a magnitude for a resolution. As such, the prediction system 170 may use additional synthetic images related to a traffic scene when the criteria are unmet and perform further training.

At 660, the prediction system 170 proceeds to the second training stage by converting a real image(s) to a synthetic representation using an adversarial network after completing the first training stage. For instance, a low-light or nighttime image(s) of a real scene may be converted to a synthetic representation. The prediction system 170 may train with real images in the second training stage for real implementation in the vehicle 100. As explained above, the second training stage may inherit weights from the first training stage for the conversion to refine and complete training of the network using real images. In one approach, the adversarial network may be a GAN and the nighttime image(s) may be a real image(s) that corresponds to a traffic scene related to the first training stage.

At 670, the prediction system 170 processes the synthetic representation using the style and depth models in daytime. In relation to processing, the prediction system 170 may compute style transfer and supervision losses to minimize and satisfy criteria for predicting depth maps associated with the real image. In one approach, the prediction system 170 may compare a predicted depth map to a point cloud generated by LIDAR simulations for a given nighttime scene to avoid reliance on actual LIDAR measurements from the vehicle 100.

At 680, the prediction system 170 uses the losses from processing the real image for training. In particular, the prediction system 170 may use the style transfer and supervised losses from generating depth maps of synthetic daytime images associated with real images. At 690, the processing in the second training stage continues until parameters meet certain criteria. For example, the criteria may be the losses from the adversarial network and depth losses satisfy a threshold for estimating a depth map during a time of day associated with the vehicle 100. Moreover, the prediction system 170 may use additional real images related to a traffic scene when the criteria are unmet and perform further second stage training. In this way, the two-stage system improves domain training and synthetic image processing for more accurate depth maps in low-light by reducing image correspondence or correlations between stages.

Figure 7:
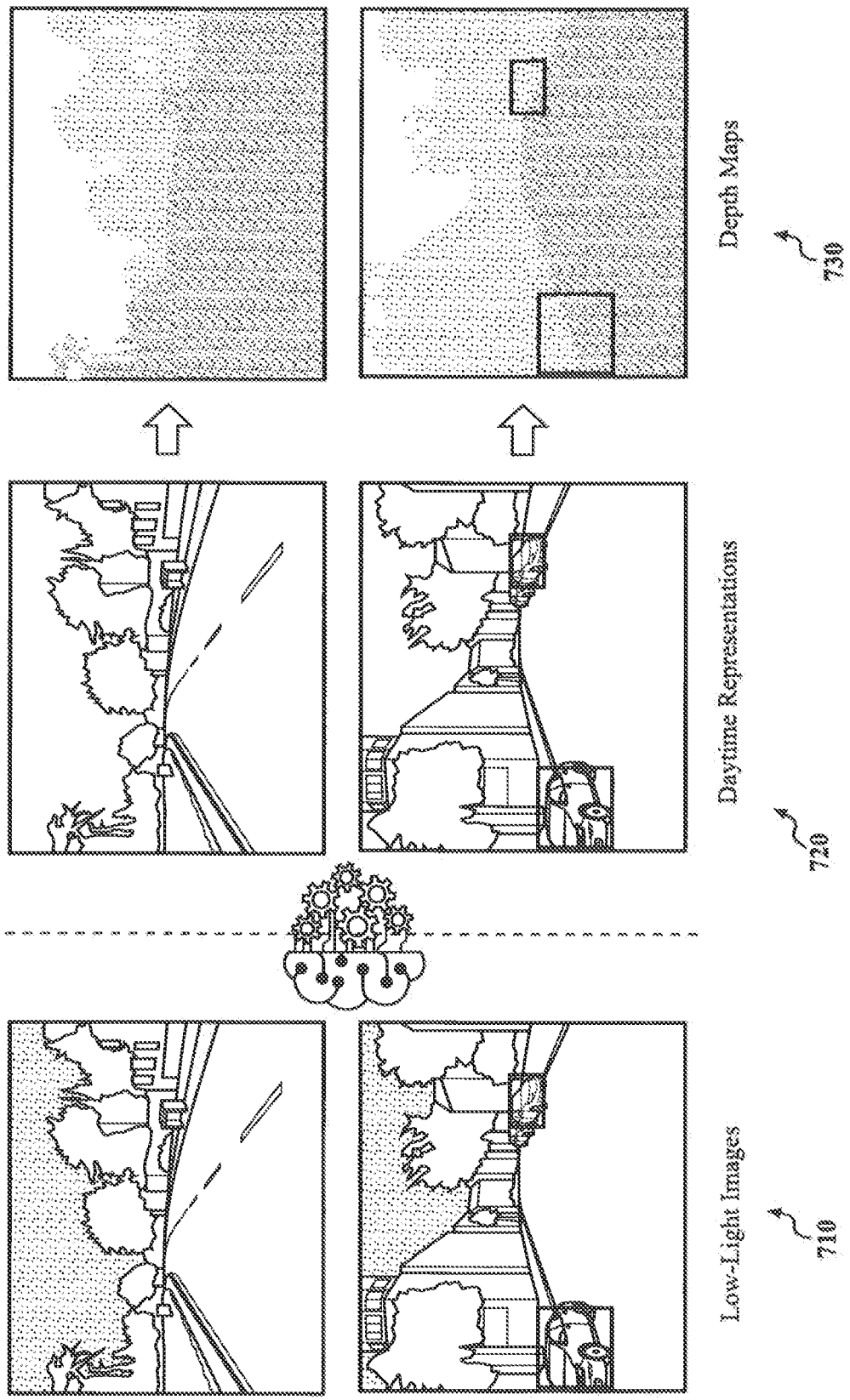
FIG. 7 illustrates an example of depth maps for low-light environments generated by a system trained using two stages.

FIG. 7 illustrates an example of depth maps for low-light environments generated by a system trained using two stages. After remote or on server training, the vehicle 100 may be pre-loaded with the prediction system 170 on an electronic control unit(s) as a perception module for real-time navigation, safety control, automation, and so on. The prediction system 170 may use low-light or nighttime images 710 of a real scene, such as from a monocular camera, to generate daytime representations 720 using style conversion. In one approach, the prediction system 170 may use a GAN for style conversion. A GAN or cGAN of the prediction system 170 may use the daytime representations 720 to predict depth maps 730. The prediction system 170 may subsequently provide the depth maps to other systems of the vehicle 100 for navigation, safety control, automation, and so on.

FIG. 1 will now be discussed in full detail as an example environment within which the system and methods disclosed herein may operate. However, in various implementations, the system and methods may operate as given above in any device such as a CE device, a mobile device, a robot, a drone, a vehicle, a cloud-based service, and so on. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation).

"Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an ECU, and an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include the sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the prediction system 170, and/or the automated or autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the prediction system 170, and/or the autonomous driving module(s) 160 may control some or all of the vehicle systems 140 and, thus, may be partially or fully autonomous as defined by the society of automotive engineers (SAE) levels 0 to 5.

The processor(s) 110, the prediction system 170, and/or the autonomous driving module(s) 160 can be operatively connected to communicate with the various vehicle systems 140 and/or individual components thereof. For example, returning to FIG. 1, the processor(s) 110, the prediction system 170, and/or the autonomous driving module(s) 160 can be in communication to send and/or receive information from the various vehicle systems 140 to control the movement of the vehicle 100. The processor(s) 110, the prediction system 170, and/or the autonomous driving module(s) 160 may control some or all of the vehicle systems 140.

The processor(s) 110, the prediction system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the prediction system 170, and/or the autonomous driving module(s) 160 can control the direction and/or speed of the vehicle 100. The processor(s) 110, the prediction system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuator(s) 150 can be an element or a combination of elements operable to alter one or more of the vehicle systems 140 or components thereof responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic or other ML algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A prediction system for depth perception, comprising:
a processor;
a memory storing instructions that, when executed by the processor, cause the processor to:
compute, in a first training stage, losses associated with predicting a depth map for a synthetic image of a low-light scene, wherein the losses include a pose loss, a flow loss, and a supervised loss and the pose loss is derived from a style model converting the synthetic image to a daytime representation;
adjust, according to the losses, the style model and a depth model, and the style model factors the pose loss and the depth model factors the flow loss for adjustments;
train, in a second training stage coupled to the first training stage and an adversarial network, the depth model that is adjusted with the flow loss using a synthetic representation of a low-light image that is real and generated from the adversarial network; and
provide the depth model.

2. The prediction system of claim 1, further including instructions to output another depth map from the daytime representation using the depth model to determine the supervised loss.

3. The prediction system of claim 2, wherein the instructions to adjust the style model and the depth model further include instructions to adjust the depth model for object movement between the daytime representation and a prior representation using the flow loss.

4. The prediction system of claim 1, wherein the instructions to compute the losses further include instructions to determine the pose loss of the style model using a pose model and the flow loss of the depth model using a flow model.

5. The prediction system of claim 1, further including instructions to:
convert, in the second training stage, the low-light image to the synthetic representation using the adversarial network that maintains content and shading of the low-light image; and
form another depth map using the synthetic representation according to the style model and the depth model that are adjusted by the first training stage.

6. The prediction system of claim 5, wherein the instructions to train the depth model further include instructions to train the adversarial network according to a semi-supervised loss of the depth map.

7. The prediction system of claim 1, further including instructions to convert the synthetic representation to another daytime representation using the style model that is adjusted to determine a depth prediction for the second training stage.

8. The prediction system of claim 1, wherein the instructions to adjust the style model and the depth model further include instructions to adjust the style model for movement using a pose model for sequential synthetic images associated with the low-light scene.

9. A non-transitory computer-readable medium for training a prediction system including instructions that when executed by a processor cause the processor to:
compute, in a first training stage, losses associated with predicting a depth map for a synthetic image of a low-light scene, wherein the losses include a pose loss, a flow loss, and a supervised loss and the pose loss is derived from a style model converting the synthetic image to a daytime representation;
adjust, according to the losses, the style model and a depth model, and the style model factors the pose loss and the depth model factors the flow loss for adjustments;
train, in a second training stage coupled to the first training stage and an adversarial network, the depth model that is adjusted with the flow loss using a synthetic representation of a low-light image that is real and generated from the adversarial network; and
provide the depth model.

10. The non-transitory computer-readable medium of claim 9, further including instructions to output another depth map from the daytime representation using the depth model to determine the supervised loss.

11. The non-transitory computer-readable medium of claim 10, wherein the instructions to adjust the style model and the depth model further include instructions to adjust the depth model for object movement between the daytime representation and a prior representation using the flow loss.

12. The non-transitory computer-readable medium of claim 9, wherein the instructions to compute the losses further include instructions to determine the pose loss of the style model using a pose model and the flow loss of the depth model using a flow model.

13. A method comprising:
computing, in a first training stage, losses associated with predicting a depth map for a synthetic image of a low-light scene, wherein the losses include a pose loss, a flow loss, and a supervised loss and the pose loss is derived from a style model converting the synthetic image to a daytime representation;
adjusting, according to the losses, the style model and a depth model, and the style model factors the pose loss and the depth model factors the flow loss for adjustments;

training, in a second training stage coupled to the first training stage and an adversarial network, the depth model that is adjusted with the flow loss using a synthetic representation of a low-light image that is real and generated from the adversarial network; and providing the depth model.

14. The method of claim 13, further comprising:

outputting another depth map from the daytime representation using the depth model to determine the supervised loss.

15. The method of claim 14, wherein adjusting the style model and the depth model further include adjusting the depth model for object movement between the daytime representation and a prior representation using the flow loss.

16. The method of claim 13, wherein computing the losses further includes determining the pose loss of the style model using a pose model and the flow loss of the depth model using a flow model.

17. The method of claim 13, further comprising:

converting, in the second training stage, the low-light image to the synthetic representation using the adversarial network that maintains content and shading of the low-light image; and forming another depth map using the synthetic representation according to the style model and the depth model that are adjusted by the first training stage.

18. The method of claim 17, wherein training the depth model further includes training the adversarial network according to a semi-supervised loss of the depth map.

19. The method of claim 13, further comprising:

converting the synthetic representation to another daytime representation using the style model that is adjusted to determine a depth prediction for the second training stage.

20. The method of claim 13, wherein adjusting the style model and the depth model further includes adjusting the style model for movement using a pose model for sequential synthetic images associated with the low-light scene.

* * * * *